US008819568B1

(12) United States Patent
Hull et al.

(10) Patent No.: US 8,819,568 B1
(45) Date of Patent: Aug. 26, 2014

(54) ELECTRONIC PAPER DISPLAY UPDATES

(75) Inventors: Christopher Thomas Hull, Sunnyvale, CA (US); John Lattyak, Los Gatos, CA (US); Lawrence Arnold Lynch-Freshner, Boulder Creek, CA (US)

(73) Assignee: Amazon Technologies, Inc., Reno, NV (US)

( * ) Notice: Subject to any disclaimer, the term of this patent is extended or adjusted under 35 U.S.C. 154(b) by 980 days.

(21) Appl. No.: 12/418,500

(22) Filed: Apr. 3, 2009

Related U.S. Application Data

(60) Provisional application No. 61/150,687, filed on Feb. 6, 2009.

(51) Int. Cl.
*G06F 3/00* (2006.01)
*G06F 15/02* (2006.01)
*G06F 3/0483* (2013.01)

(52) U.S. Cl.
CPC ................................ *G06F 15/0291* (2013.01); *G06F 3/0483* (2013.01)
USPC ........... 715/764; 715/781; 715/803; 715/804; 345/36; 345/107

(58) Field of Classification Search
CPC ........................... G06F 15/0291; G06F 3/0483
USPC ............ 345/418–475, 521, 107, 36; 715/764, 715/781, 803–804
See application file for complete search history.

(56) References Cited

U.S. PATENT DOCUMENTS

| | | | | |
|---|---|---|---|---|
| 7,126,577 | B2 * | 10/2006 | Zhou et al. | 345/107 |
| 7,193,625 | B2 * | 3/2007 | Danner et al. | 345/214 |
| 7,737,928 | B2 * | 6/2010 | Huang et al. | 345/87 |
| 8,169,400 | B2 * | 5/2012 | Shih | 345/107 |
| 2006/0017659 | A1 * | 1/2006 | Ogawa et al. | 345/30 |
| 2009/0256799 | A1 * | 10/2009 | Ohkami et al. | 345/107 |
| 2009/0315901 | A1 * | 12/2009 | Qiao et al. | 345/522 |

* cited by examiner

*Primary Examiner* — Michael Roswell
(74) *Attorney, Agent, or Firm* — Lee & Hayes, PLLC

(57) ABSTRACT

A windowing system for an electronic device that uses an electronic paper display may include a compositor, a frame buffer, and a display controller manager. One or more applications running on the electronic device may request multiple changes to windows. The compositor may determine multiple update areas, where an update area indicates the smallest area of the electronic paper display that should be updated as a result of changes being made to a window. The update areas may be stored in the frame buffer. The display controller manager may create a cumulative update area based on the update areas that are determined between a begin update instruction and an end update instruction. The display controller manager may instruct a display controller to update only the portion of the display corresponding to the cumulative update area.

23 Claims, 8 Drawing Sheets

324
Current Window A (Z=0) 316a
Current Window B (Z=1) 316b
New Window C (Z=2) 312c Current Window B (Z=1) 316b
New Window C (Z=2) 312c New Window C (Z=2) 312c Current Window A (Z=0) 316a
Current Window B (Z=1) 316b
Current Window C (Z=2) 316c

ELECTRONIC PAPER DISPLAY UPDATES

RELATED APPLICATIONS

This application is related to and claims priority from U.S. Provisional Patent Application Ser. No. 61/150,687 filed on Feb. 6, 2009, for ELECTRONIC PAPER DISPLAY UPDATES, with inventors Christopher Hull, John Lattyak and Larry Lynch-Freshner.

BACKGROUND

Electronic distribution of information has gained in importance with the proliferation of personal computers and has undergone a tremendous upsurge in popularity as the Internet has become widely available. With the widespread use of the Internet, it has become possible to distribute large, coherent units of information using electronic technologies.

Advances in electronic and computer-related technologies have permitted computers to be packaged into smaller and more powerful electronic devices. An electronic device may be used to receive and process information. The electronic device may provide compact storage of the information as well as ease of access to the information. For example, a single electronic device may store a large quantity of information that might be downloaded instantaneously at any time via the Internet. In addition, the electronic device may be backed up, so that physical damage to the device does not necessarily correspond to a loss of the information stored on the device.

In addition, a user may interact with the electronic device. For example, the user may read information that is displayed, view displayed video, or hear audio that is produced by the electronic device. Further, the user may instruct the device to display or play a specific piece of information stored on the electronic device. As such, benefits may be realized from improved techniques for interacting with an electronic device.

DETAILED DESCRIPTION

Figure 1:
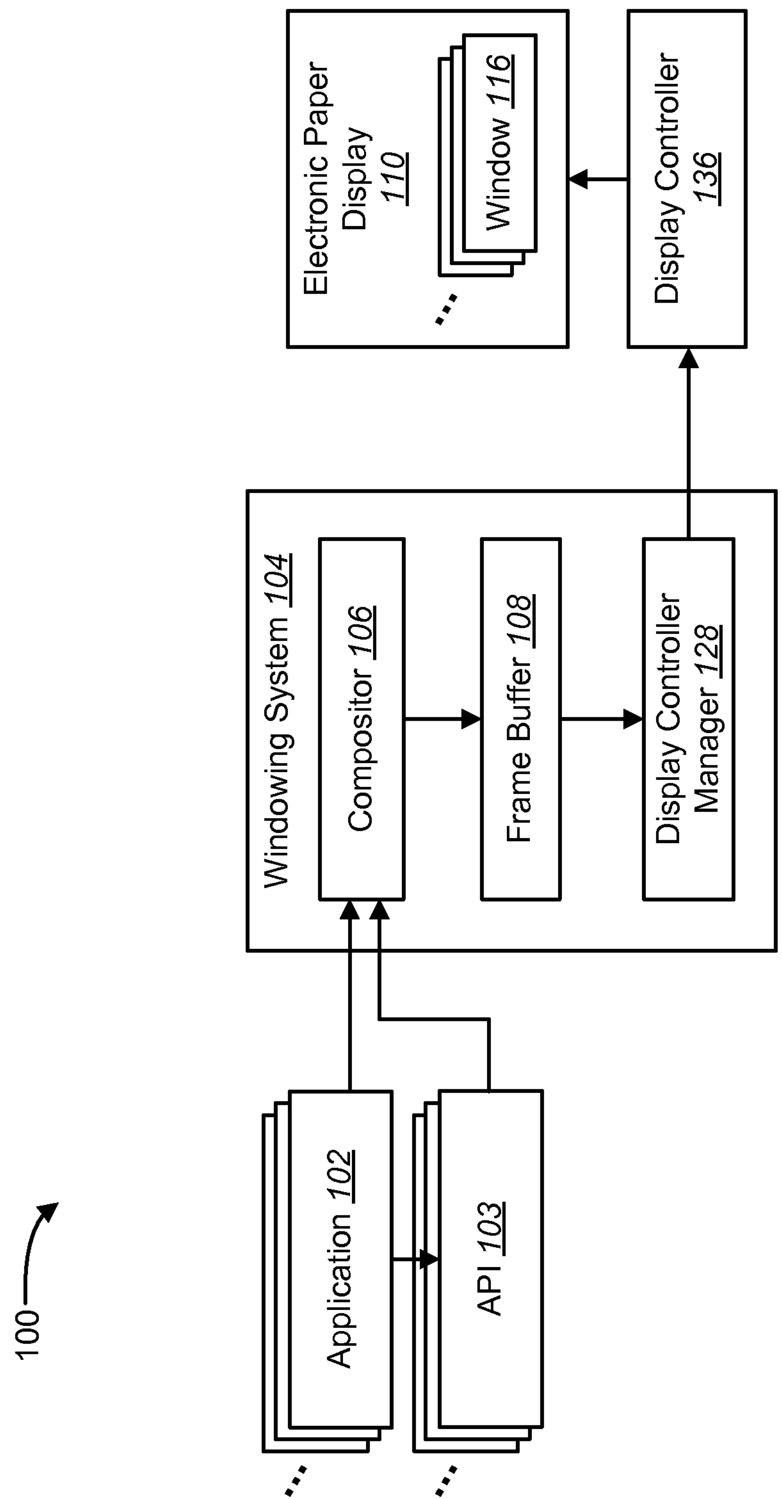
FIG. 1 is a block diagram illustrating a windowing system for a device that has an electronic paper display in accordance with one or more embodiments.

The present disclosure relates generally to displaying information on an electronic device. Electronic devices, among other things, may allow a person to store, view, and modify information. This may require a display screen. Many different types of electronic devices may include display screens, such as personal computers, laptop computers, personal digital assistants (PDA), mobile communications devices, smartphones, electronic book (e-book) readers, tablet computers, etc.

Electronic devices may also run many applications simultaneously, and each application may access the device's screen. For example, a person may use an Internet browser, a word processor, and image display software at the same time. One way to manage the display from multiple software programs is to display each program in its own "window." Each window may be layered over or beneath other windows, thus creating an orderly visual environment for the user.

Some electronic devices, such as e-book readers, may use electronic paper displays. Electronic paper mimics the appearance of ordinary ink on paper and is considered by many to be more comfortable to read than conventional displays. Additionally, electronic paper is durable, lightweight, and uses low amounts of power. In addition to these advantages, however, electronic paper displays may be slow to refresh. In contrast to conventional displays, repeatedly refreshing or updating an entire electronic paper display may result in ghosting and other undesirable effects.

The present disclosure relates to a windowing system for a device that has an electronic paper display or other type of display that has a slow refresh rate. As used herein, the phrase "slow refresh rate" may mean a refresh rate of 10 frames/second or less (i.e., the refresh period is 100 ms or more). The present disclosure provides a windowing system that manages the display needs for one or more applications. The techniques disclosed herein also minimize the extent to which a display controller updates the electronic paper display. This may be advantageous because, as mentioned above, electronic paper displays may be slow to refresh.

In accordance with the present disclosure, a windowing system may include a compositor. An application running on an electronic device may generate an output that results in a change to a window that is being visually represented on a display. The application may request that the compositor update the display accordingly. Alternatively, an application programming interface (API) (e.g., the Abstract Window Toolkit (AWT)) may instruct the compositor to update the display based on changes that have occurred to one or more windows. For example, the API may provide the compositor with a clipping rectangle.

In response to such requests from an application or from an API, the compositor may determine the smallest physical area on the electronic paper display that can be updated and still implement the requested changes. This may be referred to herein as an "update area." For example, if changes are made to a first window that is overlapped by a second window, the compositor may determine that the update area includes only the first window and the overlapping portion of the second window, rather than the entire first and second window or the entire display. Each time that such a change is requested, the compositor may determine an update area, and data corresponding to the update area may be stored in a frame buffer. As used herein, the term "frame buffer" is an area of memory that is used for display.

The windowing system may also include a display controller manager. In general terms, the display controller manager operates to minimize the number of times that the display is updated. For example, each time that the compositor determines an update area, the display is not necessarily updated immediately. Rather, the update areas are stored in a frame buffer, and the display controller manager determines a cumulative update area based on multiple update areas. More specifically, at some point the display controller manager may receive a begin update instruction, followed thereafter by an end update instruction. The cumulative update area may be a union of the update areas that the compositor determines between the begin update instruction and the end update instruction. In other words, the cumulative update area may be the smallest rectangle that encompasses the update areas that are determined between the begin update instruction and the end update instruction.

Once the cumulative update area has been determined, the display controller manager may instruct the display controller to update only the portion of the display that corresponds to the cumulative update area. Advantageously, this has the effect of minimizing updates to the electronic paper display, because the electronic paper display is only updated once for all of the update areas that are determined between the begin update instruction and the end update instruction. In addition, only the portion of the electronic paper display corresponding to the cumulative update area is updated (rather than the entire display).

FIG. 1 is a block diagram illustrating a windowing system 104 for a device 100 that has a display with a slow refresh rate, such as an electronic paper display 110. Some examples of electronic devices 100 include, but are not limited to, a personal computer, a laptop computer, a personal digital assistant (PDA), a mobile communications device, a smartphone, an electronic book (e-book) reader, a tablet computer, etc.

The application 102 may be any set of instructions within the device 100 that produces an output for visual representation on the display 110. The application 102 may be a web browser, a word processor, an image display program, etc. Furthermore, the application 102 may produce output in a form that can be visually represented as one or more windows 116. There may be multiple applications 102 running on the device 100. Each application 102 may provide output for one or more windows 116. As used herein, the term "window" 116 refers to a portion of the electronic paper display 110 that can contain its own document, message, image etc. In window-based applications 102, the electronic paper display 110 can be divided into several windows 116, each of which has its own boundaries and can contain a different document, message, image, etc. (or another view into the same document, message, image, etc.).

The windowing system 104 may receive commands from application(s) 102 and/or from API(s) 103 to make changes to the visual representation of the windows 116 that are displayed on the electronic paper display 110. For example, an application 102 or API 103 may instruct the windowing system 104 to create a new window 116, resize a window 116, move a window 116, close a window 116, change the content of a window 116, etc.

The windowing system 104 may be thought of as an intermediary between the application(s) 102 or API(s) 103 and the electronic paper display 110. The windowing system 104 may minimize updates to the electronic paper display 110, which can be slow and inefficient. As used herein, the term "update" refers to the process of altering the appearance of at least a portion of the electronic paper display 110, e.g., making text or images appear or disappear on the electronic paper display 110. The compositor 106 may be responsible for determining the smallest area to be updated on the electronic paper display 110 based on a single call from an application 102 or an API 103. For example, if an application 102 generates an output that would result in an update to a first window 116 that is overlapped by a second window 116, the compositor 106 may determine that only the first window 116 and the overlapping portion of the second window 116 need to be updated rather than the entire first and second window 116 or the entire display 110. The compositor 106 may transfer data corresponding to the area to be updated on the electronic paper display 110 into a frame buffer 108.

The windowing system 104 may include a display controller manager 128. The display controller manager 128 may determine a cumulative update area, which is the smallest area that encompasses multiple update areas determined by the compositor 106. More specifically, at some point the display controller manager 128 may receive a begin update instruction, followed thereafter by an end update instruction. The cumulative update area may be a union of the update areas that the compositor 106 determines between the begin update instruction and the end update instruction. The display controller manager 128 may send the data corresponding to the cumulative update area from the frame buffer 108 to a display controller 136, which then updates the display 110. The display controller manager 128 may instruct the display controller 136 to update only the portion of the electronic paper display 110 that corresponds to the cumulative update area. Thus, the display controller manager 128 may minimize the number of times the display 110 is updated.

The windowing system 104 may provide a user with a definable update method and allow the user to define certain aspects of the update to the electronic paper display 110, e.g., the functionality of the windowing system 104 may be provided to a user via an application programming interface (API) 103. For example, the API 103 may extend the Abstract Window Toolkit (AWT) in Java. One unique challenge in the windowing system 104 may be the need to economize access to the electronic paper display 110. Unlike conventional displays, an electronic paper display 110 may exhibit ghosting and other undesirable effects when repeatedly updated. Therefore, the windowing system 104 may update the electronic paper display 110 as infrequently as possible. This may allow application(s) 102 an/or API(s) 103 to send updates to frame buffers 108, after which the windowing system 104 may update the electronic paper display 110 in an intelligent manner.

The electronic paper display 110 may be implemented as the display screen in an electronic device 100. The electronic paper display 110 may reflect light in a similar manner to ordinary paper. The electronic paper display 104 may be capable of holding text and images indefinitely without drawing electricity, while allowing the text and images to be changed later. One example of an electronic paper display 110 that may be used is an E-Ink® display, manufactured by Prime View International Co., Ltd. There are several different technologies that may be used to create the electronic paper display 110. For example, the electronic paper display 110 may be an electrophoretic display, a bistable liquid crystal display (LCD), a cholesteric LCD display, etc.

Figure 2:
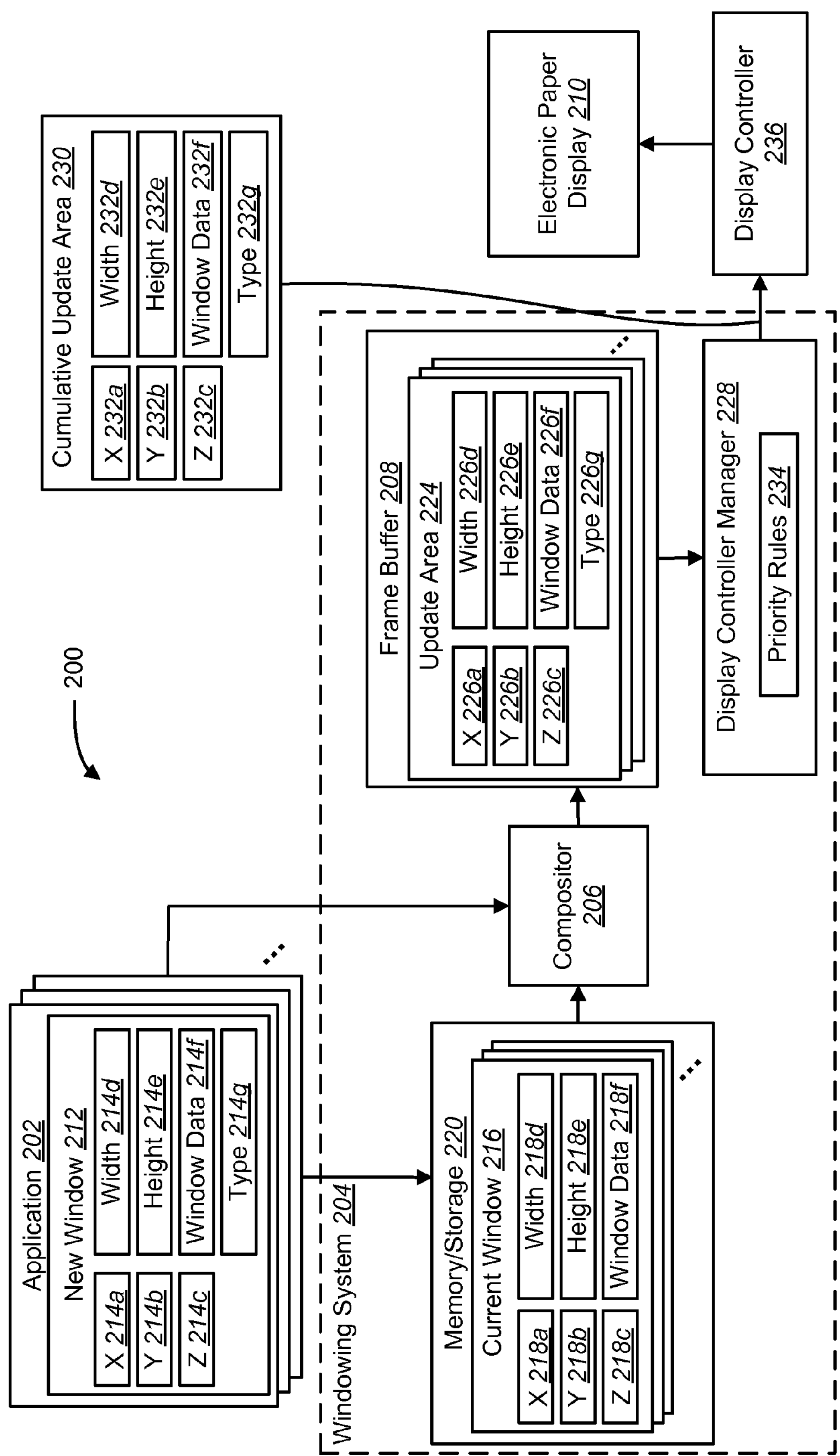
FIG. 2 is a block diagram illustrating another windowing system for a device that has an electronic paper display in accordance with one or more embodiments.

FIG. 2 is a block diagram illustrating another windowing system 204 for a device 200 that has an electronic paper display 210. The windowing system 204 shown in FIG. 2 is a more detailed version of the windowing system 104 shown in FIG. 1.

There may be many applications 202 that output windows for display on the electronic paper display 210. In the discussion that follows, a distinction will be made between a "current window" 216 and a "new window" 212. A current window 216 is a window that is currently being displayed on an electronic paper display 210. A new window 212 is a window that has been created by an application 202, but that is not yet displayed on the electronic paper display 210. A new window 212 may not have any relationship to a current window 216 (i.e., an application 202 may simply open another window 212 in addition to the current windows 216 being displayed). Alternatively, a new window 212 may be created as a result of one or more changes made to a current window 216. Thus, in accordance with the terminology used herein, a new window 212 may be produced when an application 202 deletes, moves, resizes, or otherwise changes (e.g., changes the content of) a current window 216 displayed on the electronic paper display 210.

The new window 212 may be defined by an x coordinate 214*a*, a y coordinate 214*b*, a z coordinate 214*c*, a width 214*d*, a height 214*e*, window data 214*f*, and a type 214*g*. The x coordinate 214*a* and y coordinate 214*b* may represent one of the corners of a rectangular new window 212 in the Cartesian plane. The width 214*d* and height 214*e* may represent the width and height of the new window 212, respectively. The window data 214*f* may represent the content of the new window 212 (e.g., the image data). The z coordinate 214*c* may represent the layer in which the new window 212 resides, i.e., the position of the new window 212 with respect to other overlapping windows. Alternatively, the z coordinate 214*c* may be indicated by the position of the new window 212 within a data structure in the memory/storage 220.

Additionally, the new window 212 may include data about the type 214*g* of update requested. The electronic paper display 210 may be capable of at least four types of updates: area non-flashing, area flashing, full screen non-flashing, and full screen flashing. As used herein, the term "flashing" may refer to a process of erasing an area of the electronic paper display 210. Thus, a flashing update may erase an area before updating it. In contrast, a non-flashing update may update the electronic paper display 210 without erasing it first. Therefore, the type 214*g* of update may indicate whether the application 202 desires the entire electronic paper display 210 be updated or just a portion and whether the update should use flashing or not.

The memory/storage 220 may maintain the data for each of the current windows 216 displayed on the electronic paper display 210. In other words, the data for the current windows 216 displayed on the electronic paper display 210 may be completely preserved in the memory/storage 220, whether or not they are completely displayed or are obscured by other overlapping windows. Thus, a buffer within the memory/storage 220 may be allocated for each current window 216, rather than allowing the applications 202 to directly update the electronic paper display 210. Like the new windows 212, the current windows 216 may be defined by an x coordinate 218*a*, a y coordinate 218*b*, a z coordinate 218*c*, a width 218*d*, a height 218*e*, and window data 218*f*. In one configuration, the memory/storage 220 may include a data structure that includes all the current windows 216, and the order of the current windows 216 within the data structure indicates the z coordinate 218*c*. Additionally, the memory/storage 220 may store the new windows 212 so the compositor 206 can access them.

When an application 202 creates a new window 212, the application 202 may notify the compositor 206 about the creation of the new window 212, and the compositor 206 may then determine an update area 224 for the new window 212. An update area 224 may represent the smallest area of the electronic paper display 210 that should be updated as a result of the formation of a new window 212 (which, as indicated above, may be a newly created window that does not have any relationship to the current windows 216 being displayed, or may result from changing a current window 216). Thus, an update area 224 may be determined and sent to the frame buffer 208 for each new window 212 created by an application 202. For example, if a first current window 216 is overlapped by a second current window 216, and a new window 212 is created by modifying the first current window 216, the update area 224 may include both the viewable portion of the new window 212 and the overlapping portion of the second current window 216. Likewise, if a current window 216 is resized to a smaller size, the new window 212 may only include the newly shrunk window, while the update area 224 may also include the area vacated due to the resize. The update area 224 may be defined by an x coordinate 226*a*, a y coordinate 226*b*, a z coordinate 226*c*, a width 226*d*, a height 226*e*, window data 226*f*, and a type 226*g*. The type 226*g* of the update area 224 may carry through from the type 214*g* of the new window 212.

The frame buffer 208 may include a display controller manager 228 that minimizes the number of times that the electronic paper display 210 is actually updated. The display controller manager 228 may minimize the updates by receiving update area(s) 224, determining a cumulative update area 230 that encompasses all the received update areas 224, and then sending the cumulative update area 230 to the display controller 236. In other words, the cumulative update area 230 may be a union of all the update areas 224. Thus, the cumulative update area 230 may represent all the changes indicated by the update areas 224 received from the compositor 206. In this way, the electronic paper display 210 may only be updated once instead of multiple times. The cumulative update area 230 may be defined by an x coordinate 232*a*, a y coordinate 232*b*, a z coordinate 232*c*, a width 232*d*, a height 232*e*, window data 232*f*, and a type 232*g*.

Upon receiving the update area(s) 224, the display controller manager 228 may use a set of priority rules 234 that indicate how the actual update should be done. For example, the priority rules 234 may indicate that if the type 226*g* of any of the update areas 224 specifies a full screen update, then the actual update will be full screen. Likewise, the priority rules 234 may indicate that if the type 226*g* of any of the update areas 224 specifies a flashing update, then the actual update will be flashing. Thus, the cumulative update area 230 may become the entire electronic paper display 210, rather than a single area, if one of the update areas 224 includes a type 226*g* of full screen. Likewise, the type 232*g* of the cumulative update area 230 may be flashing if any of the update areas 224 received from the compositor 206 are flashing type 226*g*.

When the display controller manager 228 receives a begin update instruction, the display controller manager 228 may wait to update the electronic paper display 210 until an end update instruction is received. The cumulative update area 230 may be a union of all of the update areas 224 that are determined by the compositor 206 between the begin update instruction and the end update instruction. When the display controller manager 228 receives the end update instruction, the cumulative update area 230 may then be sent to the display controller 236 along with instructions for the display controller 236 to update the portion of the electronic paper display 210 that corresponds to the cumulative update area 230.

FIGS. 3A-3D are block diagrams illustrating the creation of an update area 324. The update area 324 is an example of the update area 224 shown in FIG. 2. As indicated above, when an application 202 creates a new window 312, the application 202 may notify the compositor 206 about the creation of the new window 312, and the compositor 206 may then determine an update area 324 for the new window 312.

Figures 3A, 3B, 3C, 3D:
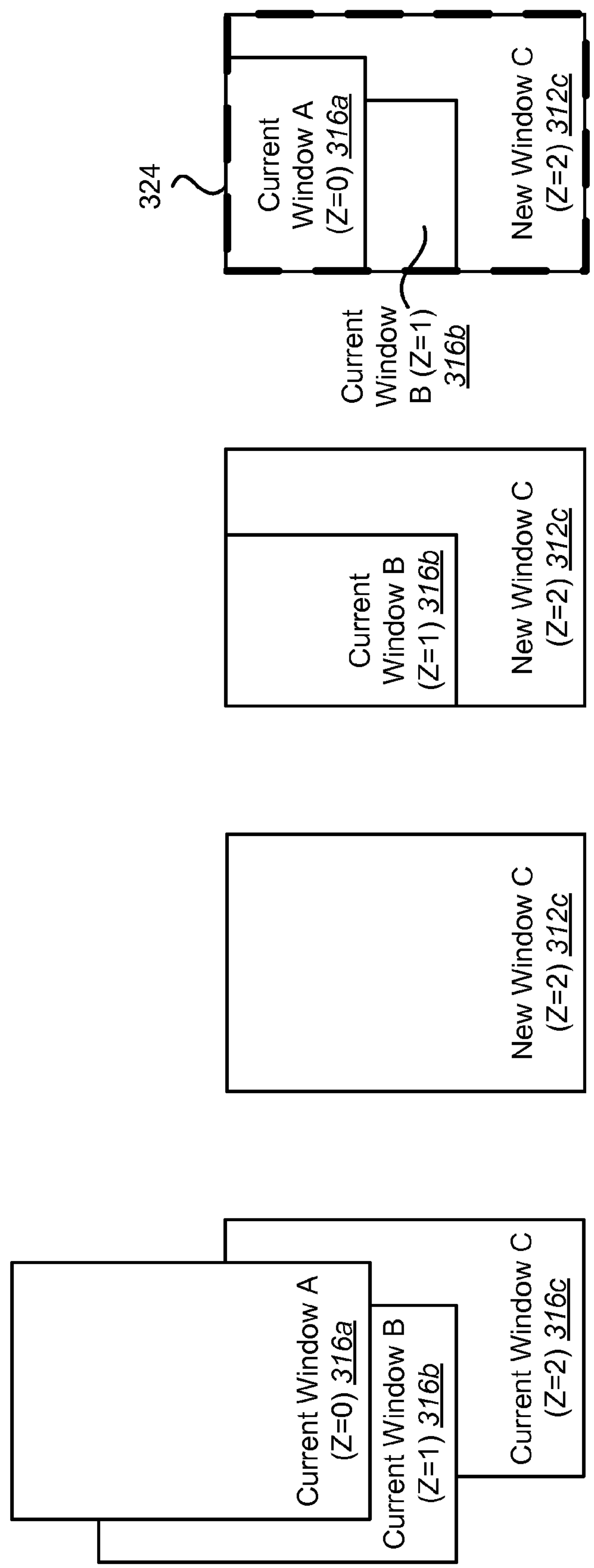
FIGS. 3A-3D are block diagrams illustrating the creation of an update area in accordance with one or more embodiments.

FIG. 3A represents three current windows 316*a*, 316*b*, 316*c* that may be displayed on an electronic paper display 210. Current window A 316*a* is in the top layer of windows (z=0), current window B 316*b* is in the middle layer (z=1), and current window C 316*c* is in the deepest layer (z=2). Note that there may be any number of layers displayed.

FIGS. 3B-3D illustrate the creation of an update area 324 from new window C 312*c*, which changes current window C 316*c*. FIGS. 3B-3D show, sequentially, what may be transferred to the frame buffer 208 as part of the creation of the update area 324. Referring initially to FIG. 3B, the compositor 206 may send new window C 312*c* to the frame buffer 208. Then, referring to FIG. 3C, the compositor 206 may send the overlapping portion of current window B 316*b* to the frame buffer 208 to be written over part of new window C 312*c*. Then, referring to FIG. 3D, the compositor 206 may send the overlapping portion of current window A 316*a* to the frame buffer 208 to be written over part of new window C 312*c* and part of current window B 316*b*. Thus, FIG. 3D may represent the update area 324 (outlined in bold dotted lines) created in response to new window C 312*c* that modifies current window C 316*c* in FIG. 3A.

FIGS. 4A-4E are block diagrams illustrating the creation of a cumulative update area 430. The cumulative update area 430 is an example of the cumulative update area 230 shown in FIG. 2. As indicated above, the cumulative update area 430 may be a union of all of the update areas 424 that are created during a period of time between a begin update instruction and an end update instruction.

Figures 4A, 4B, 4C, 4D, 4E:
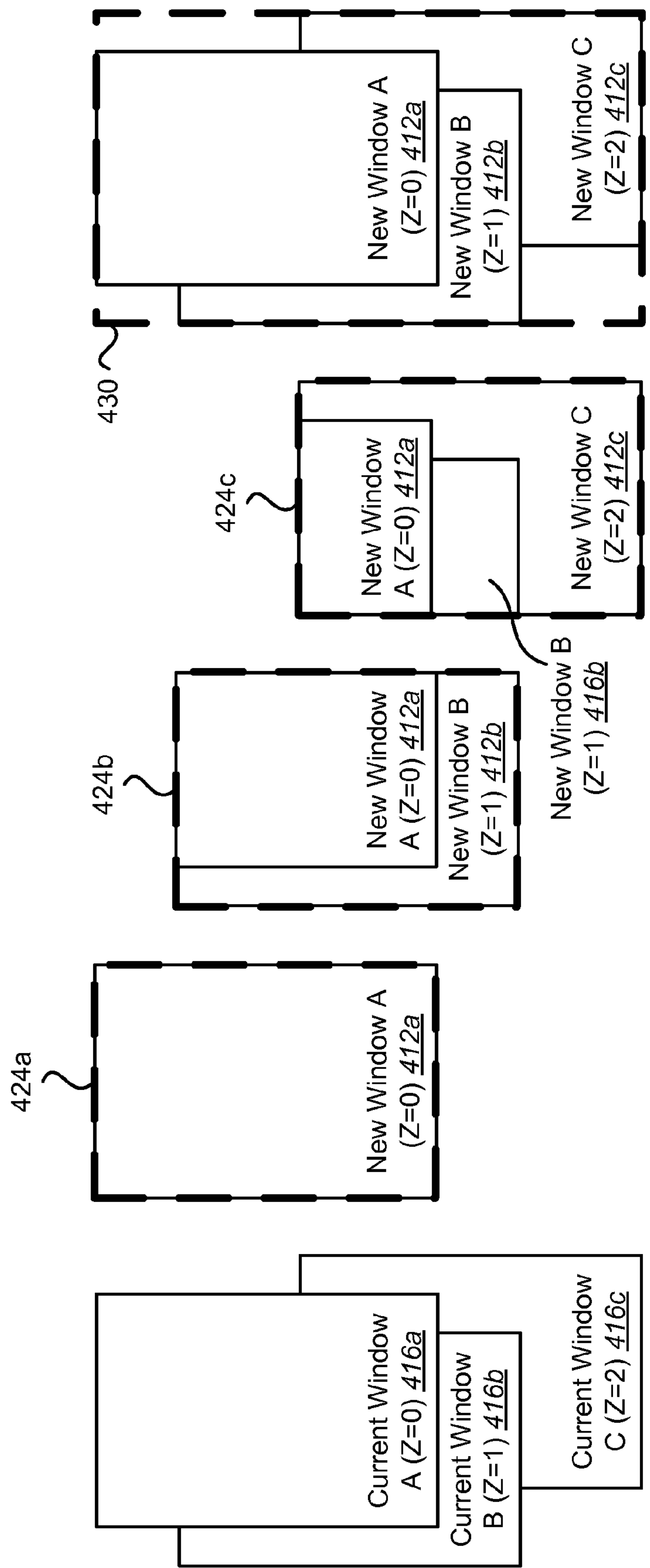
FIGS. 4A-4E are block diagrams illustrating the creation of a cumulative update area in accordance with one or more embodiments.

FIG. 4A represents three current windows 416*a*, 416*b*, 416*c* that may be displayed on an electronic paper display 210. In the example shown in FIGS. 4A-4E, current window A 416*a* is changed, then current window B 416*b* is changed, and then current window C 416*c* is changed.

FIG. 4B represents a first update area 424*a* created in response to the creation of new window A 412*a*, which modifies current window A 416*a*. New window A 412*a* has the same size and remains in the same location as current window A 416*a*. Current window A 416*a* was in the top layer (z=0), and new window A 412*a* remains in the top layer. Thus, the first update area 424*a* (outlined in bold dotted lines) only includes the new window A 412*a*.

FIG. 4C represents a second update area 424*b* created in response to the creation of new window B 412*b*, which modifies current window B 416*b*. New window B 412*b* has the same size and remains in the same location as current window B 416*b*. Current window B 416*b* was in the middle layer (z=1), and new window B 412*b* remains in the middle layer. Thus, the second update area 424*b* (outlined in bold dotted lines) includes the overlapping portion of new window A 412*a*, which is in the top layer (z=0).

FIG. 4D represents a third update area 424*c* created in response to the creation of new window C 412*c*, which modifies current window C 416*c*. New window C 412*c* has the same size and remains in the same location as current window C 416*c*. Current window C 416*c* was in the deepest layer (z=2), and new window C 412*c* remains in the deepest layer. Thus, the third update area 424*c* (outlined in bold dotted lines) includes the overlapping portions of new window A 412*a* (which is in the top layer (z=0)) and new window B 412*b* (which is in the middle layer (z=1)).

FIG. 4E represents the cumulative update area 430 (outlined in bold dotted lines) that may be created by the display controller manager 228 from the update areas 424*a-c* illustrated in FIGS. 4B-4D. As indicated above, the cumulative update area 430 may be a union of all of the update areas 424*a-c* that are created during a given period of time. Thus, the cumulative update area 430 may represent the smallest area (e.g., the smallest rectangle) that incorporates all the update areas 424*a-c*.

Without the display controller manager 228, there may be three different updates to the electronic paper display 210. First, as a result of the creation of new window A 412*a*, the portion of the electronic paper display 210 corresponding to the first update area 424*a* may be updated. Then, as a result of the creation of new window B 412*b*, the portion of the electronic paper display 210 corresponding to the second update area 424*b* may be updated. Then, as a result of the creation of new window C 412*c*, the portion of the electronic paper display 210 corresponding to the third update area 424*c* may be updated. However, with the display controller manager 228, the changes to the various windows 416*a-c* may be accumulated over a given period of time (e.g., the period of time between a begin update instruction and an end update instruction), so that there is only a single update to the electronic paper display 210. In particular, after the new windows 412*a-c* have been created, the portion of the electronic paper display 210 corresponding to the cumulative update area 430 may be updated.

Figure 5:
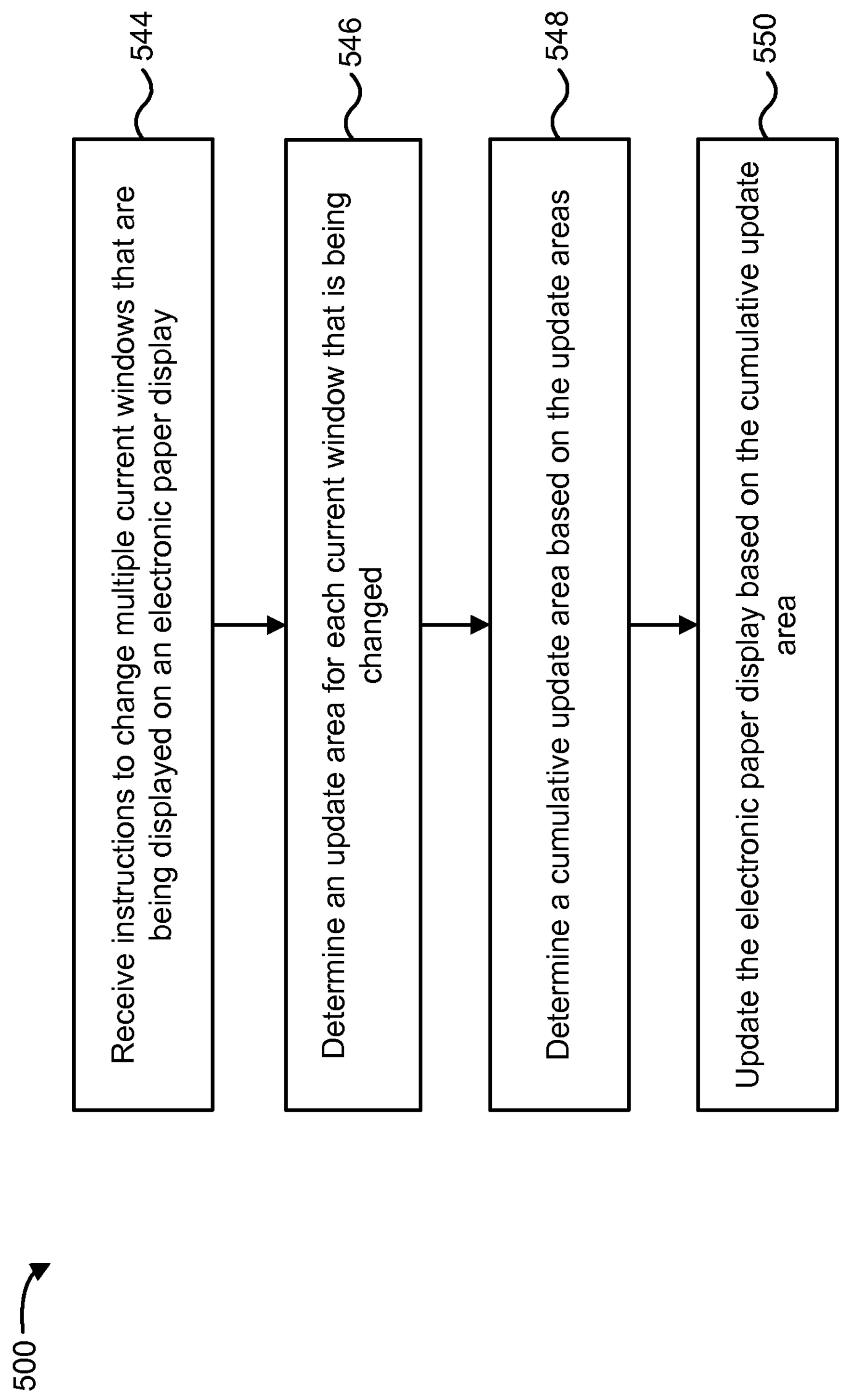
FIG. 5 is a flow diagram illustrating a method that may be implemented by a windowing system in a device that has an electronic paper display in accordance with one or more embodiments.

FIG. 5 is a flow diagram illustrating a method 500 for displaying content on an electronic paper display 210. The method 500 may be implemented by a windowing system 204 of an electronic device 200.

The windowing system 204 may receive 544 instructions to change multiple current windows 216 that are being displayed on an electronic paper display 210. The windowing system 204 may also determine 546 an update area 224 for each current window 216 that is being changed. For example, as shown in FIGS. 4B-4D, a first update area 424*a* may be determined 546 for the changes that are made to current window A 416*a* to create new window A 412*a*, a second update area 424*b* may be determined 546 for the changes that are made to current window B 416*b* to create new window B 412*b*, and a third update area 424*c* may be determined 546 for the changes that are made to current window C 416*c* to create new window C 412*c*.

The update areas 224 may include portions of overlapping windows and/or portions of the screen vacated by moving or resizing a window. For example, the second update area 424*b* includes new window B 412*b* and the overlapping portion of new window A 412*a*. Similarly, the third update area 424*c* includes new window C 412*c* and the overlapping portions of new window B 412*b* and new window A 412*a*.

The windowing system 204 may also determine 548 a cumulative update area 230 based on the update areas 224 that are determined 546 for the windows 216 that are being changed. A display controller manager 228 may delay any updates to the electronic paper display 210 until multiple update areas 224 are received and incorporated into a cumulative update area 230. For example, as illustrated in FIG. 4E, the cumulative update area 430 may be a union of all the update areas 424*a-c* that are determined 546 during a given period of time and may represent all the changes indicated by the update areas 424*a-c*.

The windowing system 204 may then update 550 the electronic paper display 210 based on the cumulative update area 430. In other words, the portion of the electronic paper display 210 corresponding to the cumulative update area 430 may be updated.

Figure 6:
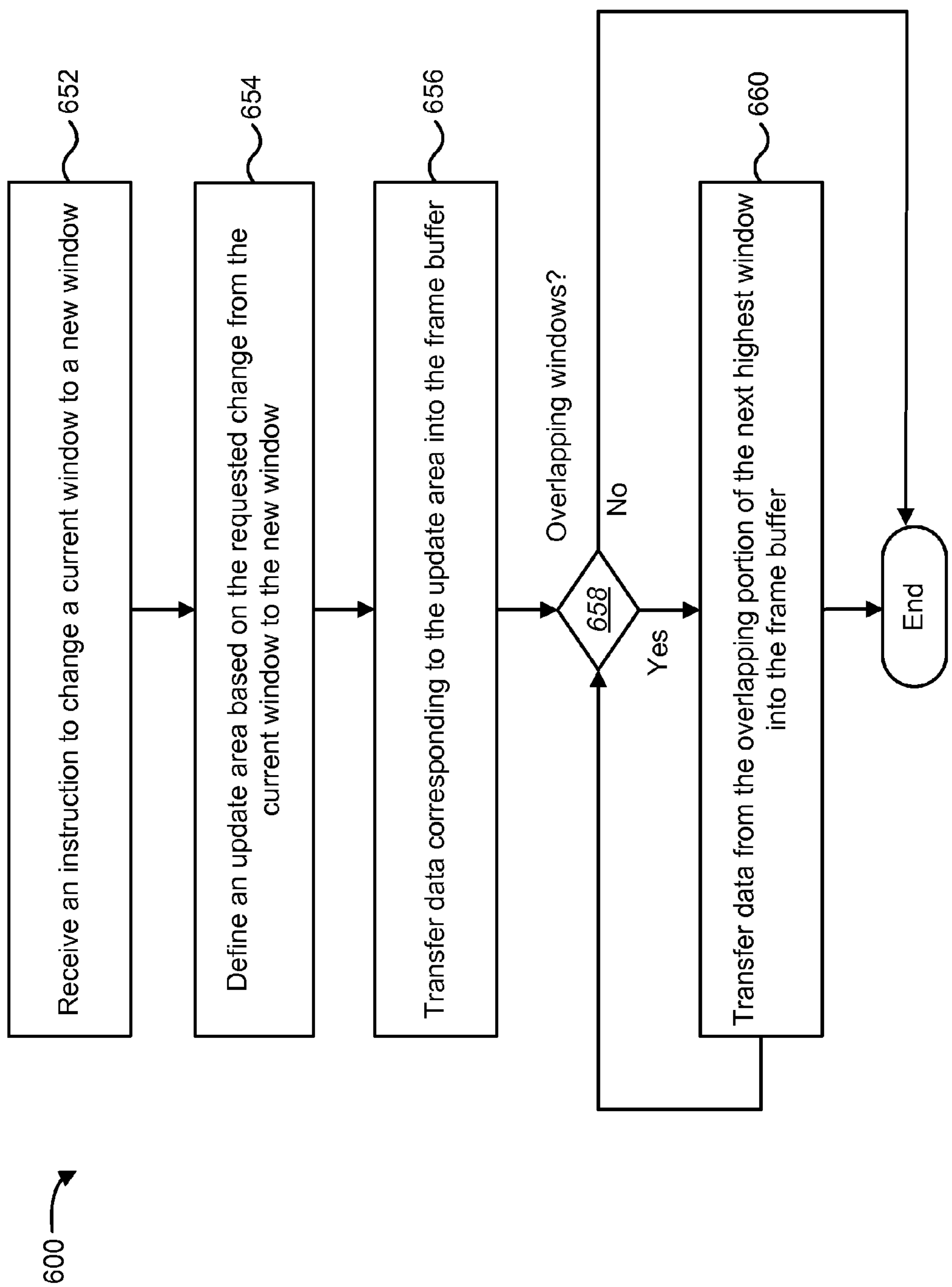
FIG. 6 is a flow diagram illustrating a method for determining an update area in accordance with one or more embodiments.

FIG. 6 is a flow diagram illustrating a method 600 for determining an update area 324. The method 600 may be implemented by a compositor 206 and will be described with reference to FIGS. 3A-3D.

The compositor 206 may receive 652 an instruction to change a current window 316*c* to a new window 312*c*. With reference to FIG. 3A, assume that a new window C 312*c* is created, which modifies current window C 316*c*. The compositor 206 may define 654 an update area 324 based on the requested change from the current window 316*c* to the new window 312*c*. With reference to FIG. 3B, the update area 324 may be defined 654 as new window C 312*c* initially. The compositor 206 may transfer 656 data corresponding to the update area 324 into the frame buffer 208.

The compositor may determine 658 whether there are overlapping windows. If yes, the compositor 206 may transfer 660 data from the overlapping portion of the next highest window into the frame buffer 208. In the example shown in FIGS. 3A-3D, current window B 316*b* is the next highest window relative to new window C 316*c*. Thus, as shown in FIG. 3C, the data for the overlapping portion of current window B 316*b* may be transferred to the frame buffer 208.

The compositor 206 may then determine 658 whether there is another overlapping window higher than current window B 316*b*. Note that this second determination 658 may look for windows that overlap new window C 312*c* that are higher than current window B 316*b*. In the present example, there is such a window, namely current window A 316*a*. Thus, as illustrated in FIG. 3D, the data for the overlapping portion of current window A 316*a* may be transferred 660 to the frame buffer 208. The compositor 206 may again determine 658 whether there is another overlapping window. This determination 658 may look for windows that overlap new window C 312*c* that are higher than new window A 316*a*. Since there are none, the method 600 may end and the update area 324 as defined in FIG. 3D may be used later by the display controller manager 228.

Figure 7:
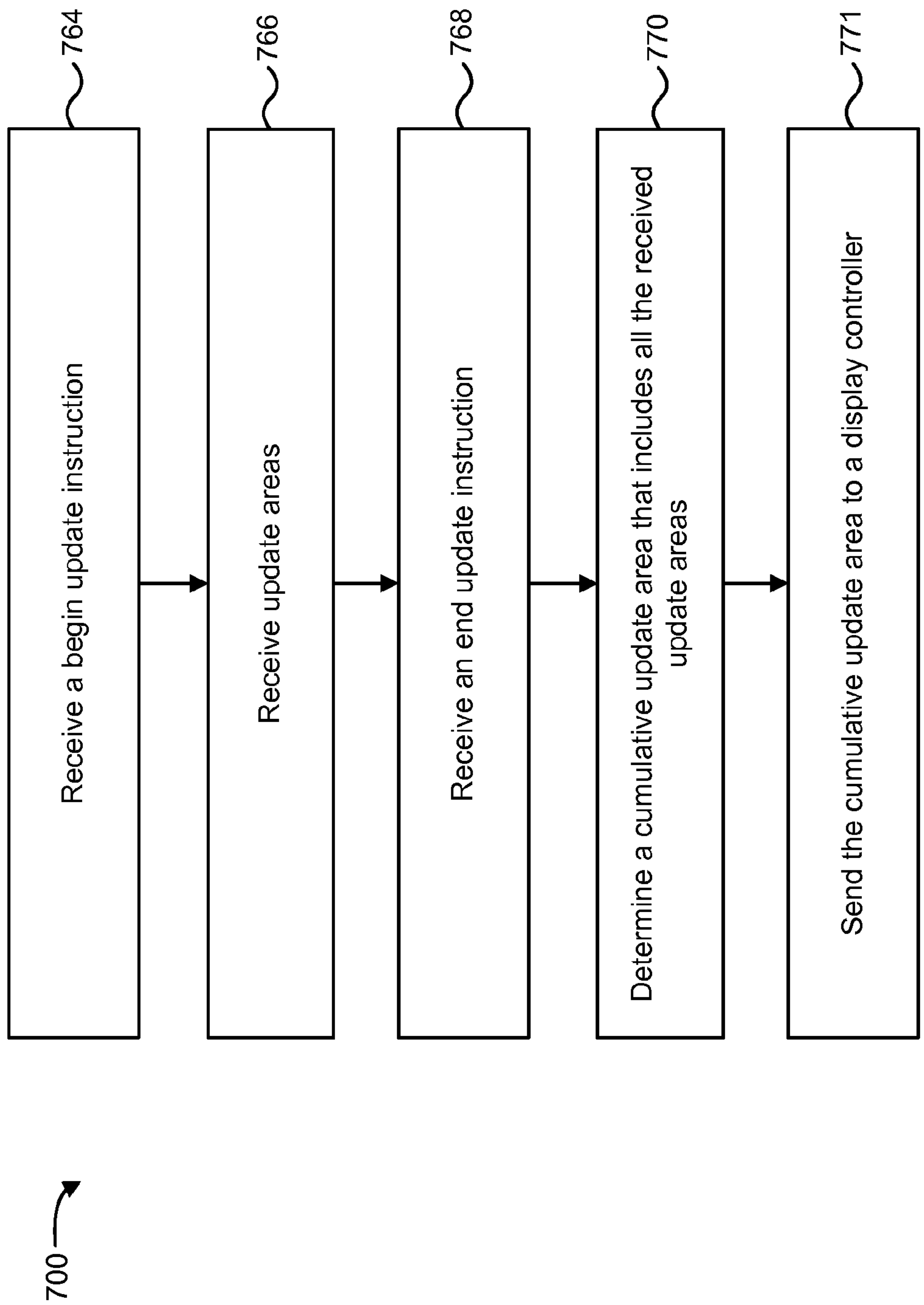
FIG. 7 is a flow diagram illustrating a method for determining a cumulative update area in accordance with one or more embodiments.

FIG. 7 is a flow diagram illustrating a method 700 for determining a cumulative update area 430. The method 700 may be implemented by a display controller manager 228.

The display controller manager 228 may receive 764 a begin update instruction. For example, if based on the actions of the user the windowing system 204 knows that multiple windows will be updated and need to be updated, a begin update instruction may be sent to the display controller manager 228.

The display controller manager 228 may receive 766 update areas 224, as determined by the compositor 206. During an update (i.e., between the time that a begin update instruction is received 764 and an end update instruction is received 768), the display controller manager 228 may defer sending any update areas 224 to an electronic paper display 210 until it receives 768 an end update instruction. Like the begin update instruction, the end update instruction may be generated by a windowing system 204 based on actions of the user. The display controller manager 228 may then determine 770 a cumulative update area 230.

For example, with respect to FIGS. 4A-4E, the update areas 424*a*, 424*b*, and 424*c* may be received 766 by a frame buffer 208 after a begin update instruction. Then, after an end update is received 768, the display controller manager 228 may determine the cumulative update area 430. Lastly, the display controller manager 228 may send 771 the cumulative update area 430 to a display controller 236 for updating the electronic paper display 210. The display controller manager 228 may send instructions to the display controller 236 that cause the display controller 236 to update only the portion of the electronic paper display 210 that corresponds to the cumulative update area 430.

Figure 8:
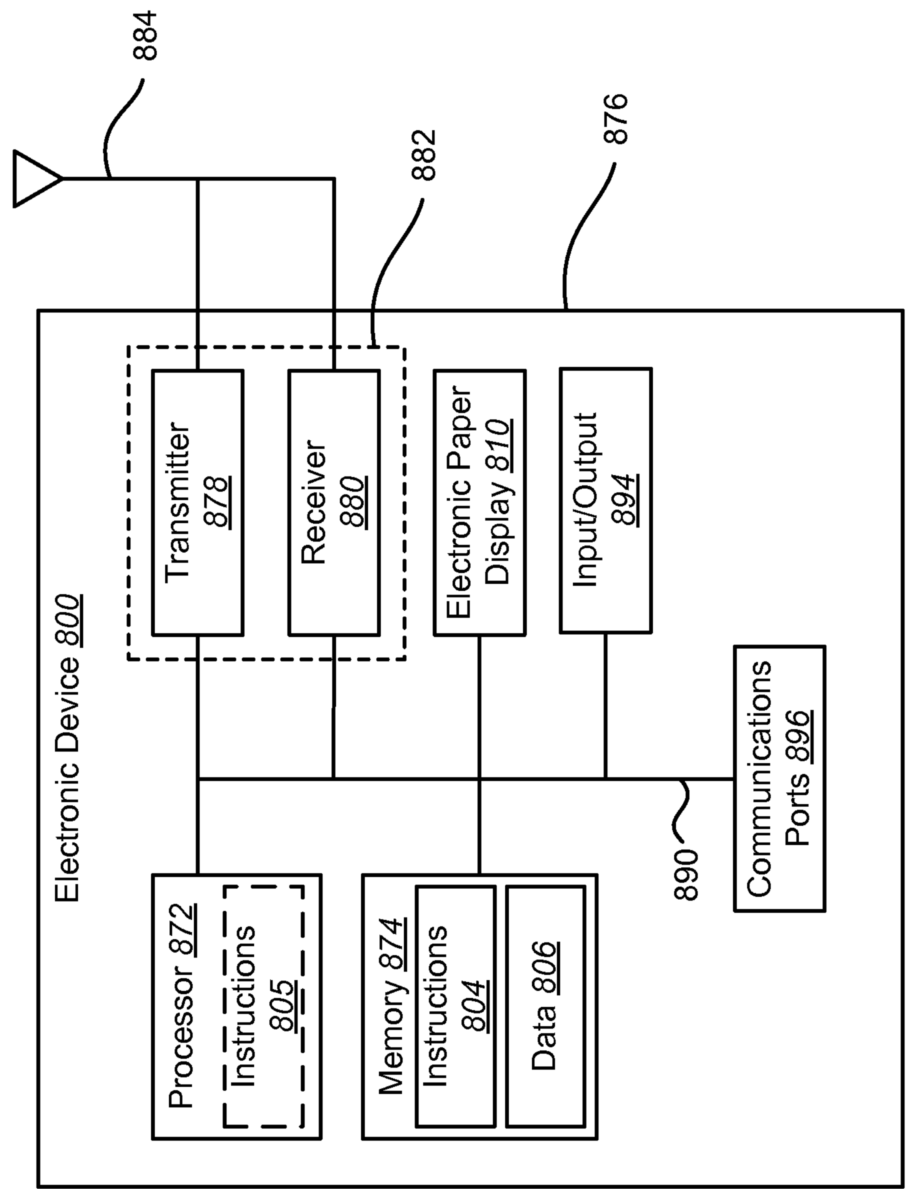
FIG. 8 illustrates various components that may be utilized in one configuration of an electronic device in accordance with one or more embodiments.

FIG. 8 illustrates various components that may be utilized in one configuration of an electronic device 800. The electronic device 800 may be used as any of the electronic devices 100, 200 discussed above. The electronic device 800 may be a personal computer, a laptop computer, a personal digital assistant (PDA), a mobile communications device, a smartphone, an electronic book (e-book) reader, a tablet computer, etc.

The electronic device 800 is shown with a processor 872 and memory 874. The processor 872 may control the operation of the electronic device 800 and may be embodied as a microprocessor, a microcontroller, a digital signal processor (DSP) or other device known in the art. The processor 872 typically performs logical and arithmetic operations based on program instructions stored within the memory 874. The instructions 804 in the memory 874 may be executable to implement the methods described herein.

Data 806 and instructions 804 may be stored in the memory 874. The processor 872 may load and execute instructions 805 from the instructions 804 in memory 874 to implement various functions. Executing the instructions 804 may involve the use of the data 806 that is stored in the memory 874. The instructions 804 are executable to implement one or more of the processes or configurations shown herein, and the data 806 may include one or more of the various pieces of data described herein.

The memory 874 may be any electronic component capable of storing electronic information. The memory 874 may be embodied as random access memory (RAM), read only memory (ROM), magnetic disk storage media, optical storage media, flash memory devices in RAM, on-board memory included with the processor, EPROM memory, EEPROM memory, an ASIC (Application Specific Integrated Circuit), registers, and so forth, including combinations thereof.

The electronic device 800 may optionally include a housing 876 that may include a transmitter 878 and a receiver 880 to allow transmission and reception of data between the electronic device 800 and a remote location. The transmitter 878 and receiver 880 may be combined into a transceiver 882. An antenna 884 may be attached to the housing 876 and electrically coupled to the transceiver 882. The electronic device 800 may also include (not shown) multiple transmitters, multiple receivers, multiple transceivers and/or multiple antenna. Note that the transceiver 882 is optional. For example, if the electronic device 800 implements a smartphone, a laptop, an electronic book (e-book) reader, or a mobile communications device, the transceiver 882 may be included. However, other configurations of the electronic device 800 may not include the transceiver 882.

The electronic device 800 may also include one or more communication ports 896. Such communication ports 896 may allow direct wired connections to be easily made with the electronic device 800.

Additionally, input/output components 894 may be included with the electronic device 800 for various input and output to and from the electronic device 800. Examples of different kinds of input components include a keyboard, keypad, mouse, microphone, remote control device, buttons, joystick, trackball, touchpad, lightpen, etc. Examples of different kinds of output components include a speaker, printer, etc.

One specific type of output component is an electronic paper display 810. As discussed above, there are several different technologies that may be used to create the electronic paper display 810. One example of an electronic paper display 810 that may be used is an E-Ink display. There are several different technologies that may be used to create the electronic paper display 810. For example, the electronic paper display 810 may be an electrophoretic display, a bistable liquid crystal display (LCD), a cholesteric LCD display, etc.

The various components of the electronic device 800 may be coupled together by a bus system 890 which may include a power bus, a control signal bus, and a status signal bus in addition to a data bus. However, for the sake of clarity, the various busses are illustrated in FIG. 8 as the bus system 890.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® Blu-ray disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A windowing system for an electronic device that uses an electronic paper display, the windowing system comprising:

a compositor configured to determine multiple update areas, wherein an update area indicates a smallest area of the electronic paper display to be updated in response to one or more changes being made to a window that is displayed on the electronic paper display, the update area including the window that is being changed and portions of higher layer windows that overlap the window, the electronic paper display capable of performing at least an area non-flashing update, an area flashing update, a full screen non-flashing update, or a full screen flashing update;

a frame buffer configured to store the multiple update areas prior to updating the window; and a display controller manager that is configured to create a cumulative update area based on the update areas that are determined during a time period between a begin update instruction and an end update instruction, and to instruct a display controller to perform an update of a portion of the display corresponding to the cumulative update area, wherein the cumulative update area comprises a union of all the update areas that are determined during the time period between the begin update instruction and the end update instruction, the update comprising one of the area flashing update or the area non-flashing update.

2. The windowing system of claim 1, wherein the display is only updated once for the update areas that are determined during the time period between the begin update instruction and the end update instruction.

3. The windowing system of claim 1, wherein the compositor is also configured to transfer data corresponding to the multiple update areas into the frame buffer.

4. The windowing system of claim 1, wherein the display controller manager is also configured to transfer data corresponding to the cumulative update area from the frame buffer to the display controller.

5. The windowing system of claim 1, wherein the cumulative update area is smaller than the entire electronic paper display.

6. A method for minimizing updates to a display, comprising:

determining multiple update areas, each update area of the multiple update areas corresponding to a smallest area of the display to be updated in response to one or more changes being made to a window that is displayed on the display, each update area including the window that is being changed and portions of higher layer windows that overlap the window;

determining a cumulative update area based on the update areas that are determined during a time period between a begin update instruction and an end update instruction; and performing an update of the display based on the cumulative update area, the update comprising one of an area non-flashing update, an area flashing update, a full screen non-flashing update, or a full screen flashing update.

7. The method of claim 6, wherein the display is only updated once for the update areas that are determined during the time period between the begin update instruction and the end update instruction, and wherein only the portion of the display corresponding to the cumulative update area is updated.

8. The method of claim 6, further comprising transferring data corresponding to the multiple update areas into a frame buffer.

9. The method of claim 6, wherein the cumulative update area comprises a union of the update areas that are determined during the time period between the begin update instruction and the end update instruction.

10. The method of claim 6, further comprising transferring data corresponding to the cumulative update area from a frame buffer to a display controller.

11. The method of claim 6, wherein updating the display based on the cumulative update area comprises instructing a display controller to update only a portion of the display corresponding to the cumulative update area.

12. The method of claim 6, wherein the cumulative update area is smaller than the entire display.

13. An electronic device, comprising:

a display;

a compositor configured to determine multiple update areas, each update area of the multiple update areas corresponding to a smallest area of the display to be updated in response to one or more changes being made to a window that is displayed on the display, each update area including the window that is being changed and portions of higher layer windows that overlap the window;

a display controller; and a display controller manager that is configured to:

determine a cumulative update area based on the update areas that are determined during a time period between a begin update instruction and an end update instruction, determine whether to perform an update that includes a flashing update or a non-flashing update, and instruct the display controller to perform the update to a portion of the display corresponding to the cumulative update area.

14. The electronic device of claim 13, wherein the display is only updated once for the update areas that are determined during the time period between the begin update instruction and the end update instruction, and wherein only the portion of the display corresponding to the cumulative update area is updated.

15. The electronic device of claim 13, further comprising a frame buffer configured to store the multiple update areas.

16. The electronic device of claim 13, wherein the compositor is also configured to transfer data corresponding to the multiple update areas into a frame buffer.

17. The electronic device of claim 13, wherein the cumulative update area comprises a union of the update areas that are determined during the time period between the begin update instruction and the end update instruction.

18. The electronic device of claim 13, wherein the display controller manager is also configured to transfer data corresponding to the cumulative update area from a frame buffer to the display controller.

19. The electronic device of claim 13, wherein the cumulative update area is smaller than the entire display.

20. A non-transitory computer-readable storage medium comprising instructions executable by a processor for:

determining multiple update areas, each update area of the multiple update areas corresponding to a smallest area of the display to be updated in response to one or more changes being made to a window that is displayed on the display, each update area comprising the window that is being changed and overlapping portions of higher layer windows;

determining a cumulative update area based on the update areas that are determined during a time period between a begin update instruction and an end update instruction, wherein the cumulative update area is smaller than an entire display but larger than any single update area;

determining an update to perform based on the cumulative update area, the update comprising one of an area non-flashing update, an area flashing update, a full screen non-flashing update, and a full screen flashing update; and performing the update of the display.

21. The non-transitory computer-readable storage medium of claim 20, wherein the display is only updated once for the update areas that are determined during the time period between the begin update instruction and the end update instruction, and wherein only the portion of the display corresponding to the cumulative update area is updated.

22. The non-transitory computer-readable storage medium of claim 20, wherein the cumulative update area comprises a union of the update areas that are determined during the time period between the begin update instruction and the end update instruction.

23. The non-transitory computer-readable storage medium of claim 20, wherein performing the update of the display based on the cumulative update area comprises instructing a display controller to update a portion of the display corresponding to the cumulative update area.

* * * * *